United States Patent
Hwang et al.

(10) Patent No.: US 7,786,934 B2
(45) Date of Patent: Aug. 31, 2010

(54) APPARATUS AND METHOD FOR REMOVING INTERFERENCE IN TRANSMITTING END OF MULTI-ANTENNA SYSTEM

(75) Inventors: In-Soo Hwang, Yongin-si (KR); Myeon-Kyun Cho, Seongnam-si (KR); Dong-Ho Kim, Seoul (KR); Young-Ho Jung, Suwon-si (KR); Yung-Soo Kim, Seongnam-si (KR); Yu-Seok Kim, Seoul (KR); Vahid Tarokh, Cambridge, MA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/030,639

(22) Filed: Feb. 13, 2008

(65) Prior Publication Data

US 2008/0198071 A1   Aug. 21, 2008

(30) Foreign Application Priority Data

Feb. 13, 2007   (KR) .................... 10-2007-0014718

(51) Int. Cl.
*H01Q 3/00* (2006.01)
*G01S 1/00* (2006.01)
(52) U.S. Cl. ..................................... 342/373; 342/386
(58) Field of Classification Search ................. 342/154, 342/157, 368, 372, 373, 386; 455/63.1, 63.4, 455/67.13; 375/267
See application file for complete search history.

(56) References Cited

U.S. PATENT DOCUMENTS

| | | | |
|---|---|---|---|
| 7,555,050 B2* | 6/2009 | Har et al. ..................... | 375/260 |
| 2007/0232235 A1* | 10/2007 | Li et al. ..................... | 455/63.1 |
| 2009/0016460 A1* | 1/2009 | Hwang et al. ............... | 375/267 |

FOREIGN PATENT DOCUMENTS

| | | |
|---|---|---|
| KR | 1020050020576 | 3/2005 |
| WO | WO 2006/020434 | 2/2006 |

* cited by examiner

*Primary Examiner*—Dao L Phan
(74) *Attorney, Agent, or Firm*—The Farrell Law Firm, LLP

(57) ABSTRACT

An apparatus and method for removing interference in a transmitting end of a multi-antenna system are provided. The method includes receiving channel information for all Receive (Rx) antennas; calculating a beam-forming matrix that maximizes a Signal-to-Interference plus Noise Ratio (SINR) for each Rx antenna by using the received channel information; calculating an integer value which is in proportion to an interference signal for each Rx antenna by using the received channel information and the calculated beam-forming matrix, and performing Dirty Paper Coding (DPC) on a Transmit (Tx) signal by using the calculated integer value; and performing beam-forming by multiplying the Tx signal that has undergone the DPC by the calculated beam-forming matrix. Accordingly, a highest data rate for each user and a highest diversity can be obtained.

20 Claims, 4 Drawing Sheets

APPARATUS AND METHOD FOR REMOVING INTERFERENCE IN TRANSMITTING END OF MULTI-ANTENNA SYSTEM

PRIORITY

This application claims priority under 35 U.S.C. §119(a) to a Korean patent application filed in the Korean Intellectual Property Office on Feb. 13, 2007 and assigned Serial No. 2007-14718, the entire disclosure of which is hereby incorporated by reference.

BACKGROUND OF THE INVENTION

1. Field of the Invention

The present invention relates generally to a multi-antenna system, and in particular, to an apparatus and method for removing interference in a transmitting end of the multi-antenna system.

2. Description of the Related Art

A multi-user multi-antenna system has conventionally employed either a Zero-Forcing (ZF) scheme or a Minimum Mean Square Error (MMSE) scheme. In the ZF scheme, a signal transmitted from a transmitting end is multiplied by an inverse of a channel matrix so as to reduce interference with a different user or a different antenna. In the MMSE scheme, signal transmission is achieved taking a noise variation of a channel into account.

The ZF scheme and the MMSE scheme are based on linear pre-coding and have advantages in that a transmission process of the transmitting end can be easily implemented, and an error rate is not significantly increased even when an amount of channel feedback information transmitted from users is not sufficient.

On the other hand, some examples of schemes based on nonlinear pre-coding include a Tomlinson-Harashima Pre-coding (THP) scheme in which Dirty Paper Coding (DPC) is applied to a one-dimensional vector and a Vector Perturbation (VP) scheme in which the DPC is applied to an $n^{th}$ dimensional vector. In such nonlinear pre-coding schemes, the transmitting end allows a Transmit (Tx) signal to be subject to a modulo operation so that a positive integer value is added to or subtracted from the Tx signal, and transmits the resultant signal to a receiving end. Even when the receiving end does not know the positive integer value, the receiving end can estimate the signal through the same modulo operation used in the transmitting end. Accordingly, the transmitting end can optimize both a channel and the Tx signal. Hence, the nonlinear pre-coding schemes have been researched as a promising technology in a Time Division Duplex (TDD) nomadic environment where feedback is frequently made to the transmitting end.

Meanwhile, the ZF scheme and the MMSE scheme have disadvantages, such as that performance deterioration and Tx power loss are inevitable, Tx power has to be constant for each user or each antenna, each user has to use only one antenna, and in particular, discrepancy between sum capacity and ideal capacity becomes significant as Signal-to-Noise Ratio (SNR) increases.

Moreover, the DPC-based nonlinear pre-coding schemes have demerits, such as that a data rate has to be constant for each user, and each user has to use only one Receive (Rx) antenna. Therefore, disadvantageously, Quality of Service (QoS) for each user cannot be properly ensured. In addition, complexity increases significantly since the transmitting end has to use an encoder based on complex Maximum Likelihood (ML) estimation.

Accordingly, there is a demand for a method in which performance can be maximized by optimizing a data rate and Tx power for each user while reducing complexity in a multi-antenna system.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for removing interference in a transmitting end of a multi-antenna system.

Another aspect of the present invention is to provide an apparatus and method for removing interference that may exist in a Receive (Rx) signal by using a Dirty Paper Coding (DPC)-based process and a beam-forming scheme in a transmission end of a multi-antenna system.

Another aspect of the present invention is to provide an apparatus and method for removing interference to obtain a highest data rate for each user and to obtain a highest diversity order in a transmitting end of a multi-antenna system.

Another aspect of the present invention is to provide an apparatus and method for removing interference to maintain similar performance while reducing complexity in comparison with a conventional DPC in a transmitting end of a multi-antenna system.

According to an aspect of the present invention, a method of transmitting a signal in a transmitting end of a multi-antenna system is provided. The method includes receiving channel information for all Rx antennas; calculating a beam-forming matrix that maximizes a Signal-to-Interference plus Noise Ratio (SINR) for each Rx antenna by using the received channel information; calculating an integer value which is in proportion to an interference signal for each Rx antenna by using the received channel information and the calculated beam-forming matrix, and performing DPC on a Transmit (Tx) signal by using the calculated integer value; and performing beam-forming by multiplying the Tx signal that has undergone the DPC by the calculated beam-forming matrix.

According to another aspect of the present invention, an apparatus for transmitting a signal in a transmitting end of a multi-antenna system is provided. The apparatus includes a beam-forming matrix calculator for receiving channel information for all Rx antennas and for calculating a beam-forming matrix that maximizes an SINR for each Rx antenna by using the received channel information; a DPC unit for calculating an integer value which is in proportion to an interference signal for each Rx antenna by using the received channel information and the calculated beam-forming matrix, and for performing DPC on a Tx signal by using the calculated integer value; and a beam-forming unit for performing beam-forming by multiplying the Tx signal that has undergone the DPC by the calculated beam-forming matrix.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

The following description with reference to the accompanying drawings is provided to assist in a comprehensive understanding of the present invention as defined by the claims and their equivalents. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Hereinafter, an apparatus and method for removing interference in a transmitting end of a multi-antenna system will be described.

It is assumed that a system model used in the present invention is constructed of N Transmit (Tx) antennas and M Receive (Rx) antennas (or M users having one Rx antenna). In the following description, a Base Station (BS) is used as an example of the transmitting end, and a Mobile Station (MS) is used as an example of a receiving end.

The MS receives an Rx signal expressed by Equation (1).

$$r_t = Hx_t + n = HAc + n = Bc + n \quad (1)$$

Herein, $r_t$ denotes an Rx signal received by the MS at time t, $x_t$ denotes a Tx signal transmitted by the BS at time t, n denotes noise, and c denotes a Tx signal that has undergone modulation and channel encoding. H denotes an M×N channel matrix, A denotes a N×M beam-forming matrix, and B denotes a matrix that is a product of the channel matrix H and the beam-forming matrix A.

Elements of the Rx signal can be expressed by Equation (2).

$$r_{t,j} = \sum_{i=1}^{M} b_{j,i} c_{t,i} + n_{t,j} \quad (2)$$

Herein, j denotes an Rx antenna index, i denotes a Tx antenna index (where, j=1, 2, . . . , M), and b denotes an element of the matrix B.

Therefore, the Rx signal for each Rx antenna can be expressed by Equation (3).

$$r_1 = b_{1,1}c_1 + b_{1,2}c_2 + \ldots + b_{1,M}c_M + n_1 \quad (3)$$
$$r_2 = b_{2,1}c_1 + b_{2,2}c_2 + \ldots + b_{2,M}c_M + n_2$$
$$\vdots$$
$$r_j = b_{j,1}c_1 + b_{j,2}c_2 + \ldots + b_{j,j}c_j + \ldots + b_{j,M}c_M + n_j$$
$$\vdots$$
$$r_M = b_{M,1}c_1 + b_{M,2}c_2 + \ldots + b_{M,M}c_M + n_M$$

As such, the Rx signal for each Rx antenna has interference of multiple users. The present invention provides a method of reducing the interference of the multiple users in such a manner that Dirty Paper Coding (DPC) is used to remove interference that forms a lower triangular matrix in the channel matrix while beam-forming is used to remove interference that forms an upper triangular matrix in the channel matrix.

Figure 1:
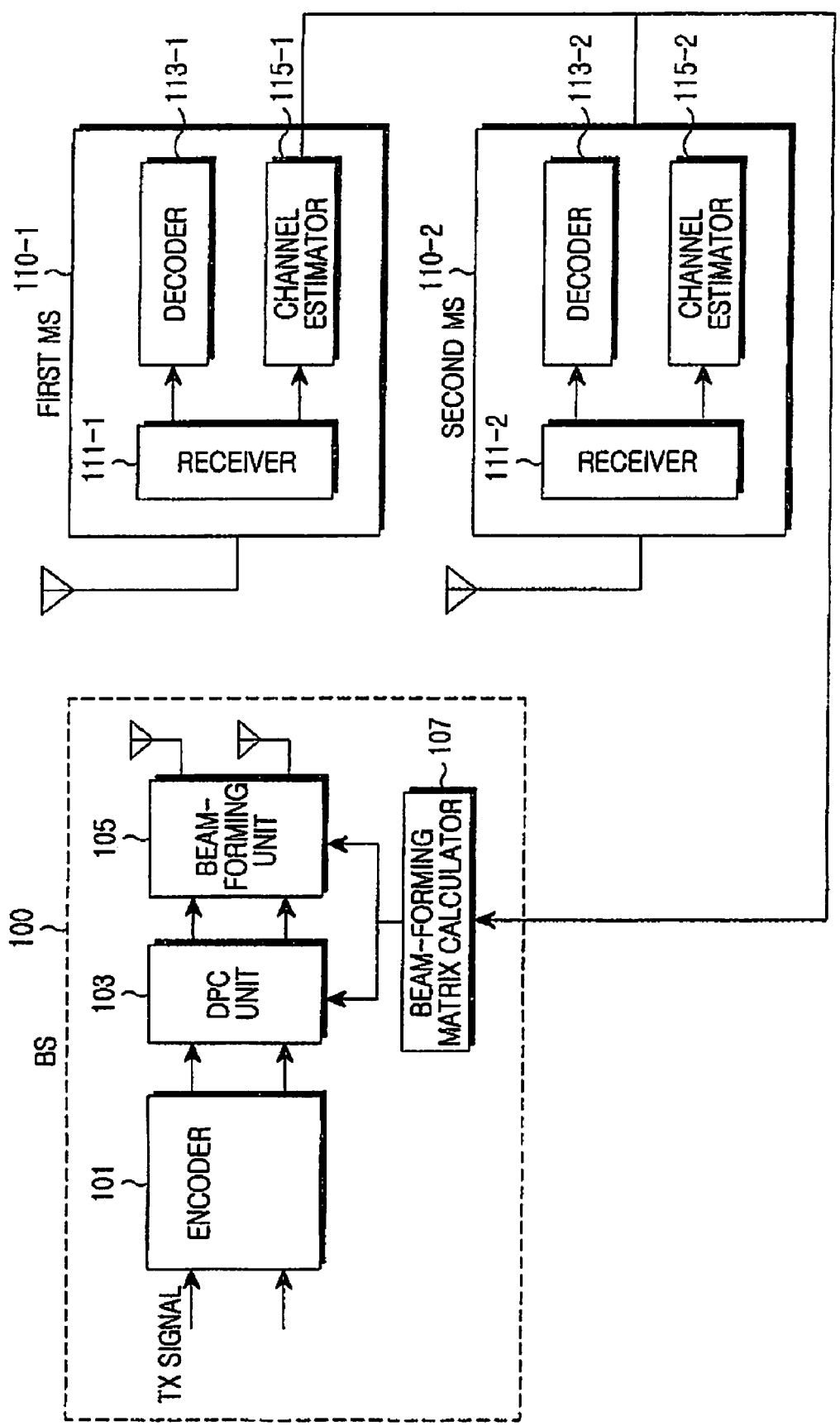
FIG. 1 is a block diagram illustrating an architecture of a multi-antenna system according to the present invention.

FIG. 1 is a block diagram illustrating an architecture of a multi-antenna system according to the present invention. Although a 2×2 Multi-Input Multi-Output (MIMO) system will be illustrated in the following description as an example, the present invention is not limited thereto. Thus, the present invention may also apply to general M×N systems. It is assumed that the multi-antenna system is constructed of a BS 100 having two Tx antennas and two MSs 110-1 and 110-2 each having one Rx antenna. The BS 100 includes an encoder 101, a DPC unit 103, a beam-forming unit 105, and a beam-forming matrix calculator 107. The first and second MSs 110-1 and 110-2 respectively include receivers 111-1 and 111-2, decoders 113-1 and 113-2, and channel estimators 115-1 and 115-2.

The encoder 101 of the BS 100 performs modulation and channel encoding on a Tx signal for each Rx antenna, and then outputs the modulated and channel-encoded Tx signal to the DPC unit 103.

The DPC unit 103 calculates an integer value, which is in proportion to an interference signal for each Rx antenna by using a channel matrix and a beam-forming matrix received from the beam-forming matrix calculator 107. Then, by using the calculated integer value, the DPC unit 103 performs DPC on the Tx signal to remove interference that forms a lower triangular matrix in the channel matrix from among multi-user interference existing in the Rx signal. As a result, the BS 100 can determine one constellation point by considering interference, and map the Tx signal to the determined constellation point. Thereafter, the DPC unit 103 outputs the Tx signal mapped to the constellation point to the beam-forming unit 105 by performing DPC. Herein, a modulo operation is used when the DPC is performed.

The beam-forming unit 105 performs beam-forming by multiplying the Tx signal mapped to the constellation point by the beam-forming matrix provided from the beam-forming matrix calculator 107, and then transmits the resulting signal to a corresponding MS.

The beam-forming matrix calculator 107 receives channel information from each of the MSs 110-1 and 110-2, and calculates a beam-forming matrix that maximizes a Signal-to-Interference plus Noise Ratio (SINR) by using the received channel information. The calculated beam-forming matrix is used to remove interference that forms the upper triangular matrix in the channel matrix from among the multi-user interference existing in the Rx signal. Thereafter, the beam-forming matrix calculator 107 outputs the calculated beam-forming matrix to the beam-forming unit 105, and outputs the channel matrix, which corresponds to the channel information, and the calculated beam-forming matrix to the DPC unit 103.

The receivers 111-1 and 111-2 of the MSs 110-1 and 110-2 respectively receive signals from the BS 100, and respectively output the received signals to the decoders 113-1 and 113-2 and the channel estimators 115-1 and 115-2. The decoders 113-1 and 113-2 perform a modulo operation on Rx signals received from the receivers 111-1 and 111-2 by using the same modulo operation used in the BS 100, and thus detect original signals from the Rx signals. Further, the channel estimators 115-1 and 115-2 estimate channels by using the Rx signals received from the receivers 111-1 and 111-2, and then transmit information on the estimated channel to the BS 100.

Figure 2:
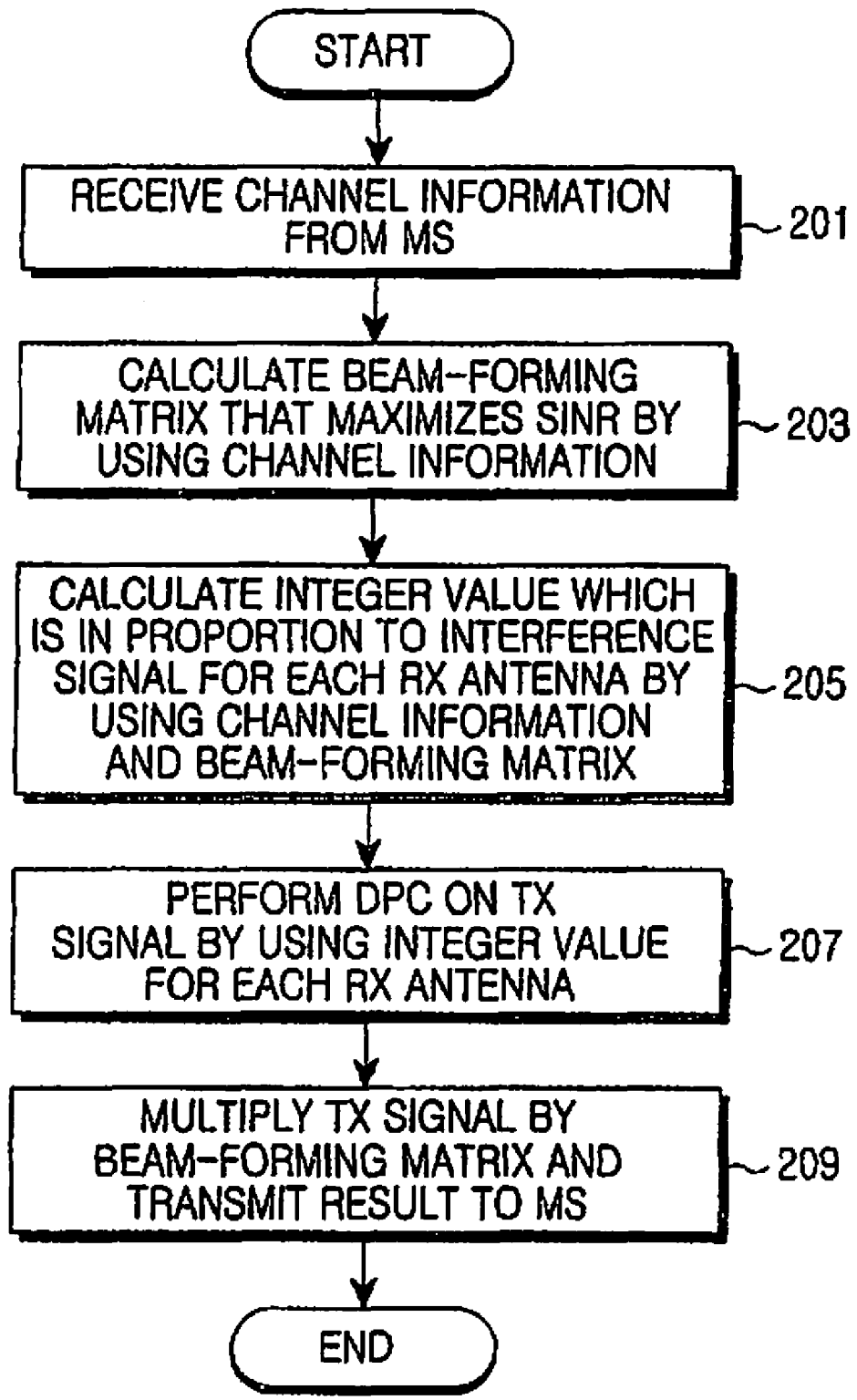
FIG. 2 is a flowchart illustrating a method of removing interference in a Base Station of a multi-antenna system according to the present invention.

FIG. 2 is a flowchart illustrating a method of removing interference in a BS of a multi-antenna system according to the present invention. Referring to FIG. 2, the BS receives channel information from all MSs in step 201. Then, the BS calculates a beam-forming matrix that maximizes an SINR by using the received channel information in step 203. Each MS measures a DownLink (DL) channel according to an Rx signal, and feeds back the channel information to the BS. Then, by using the channel information, the BS can calculate a beam-forming matrix for removing interference that forms an upper triangular matrix in a channel matrix from among multi-user interference. For example, in the case of $r_j$ of Equation (3) above, the BS can calculate a beam-forming matrix by removing $b_{j,j+1}c_{j+1}+\ldots+b_{j,M-1}c_{M-1}+b_{j,M}c_M$.

Herein, the SINR can be calculated by using Equation (4).

$$\lambda_j = \frac{|b_{j,j}|^2}{|b_{j,j+1}|^2 + \ldots + |b_{j,M}|^2 + 1/SNR_j} \text{ where } b_{i,j} = \sum_{k=1}^{N} h_{i,k} a_{k,j} \quad (4)$$

Herein, $\lambda_j$ denotes the SINR (Signal to Interference and Noise Ratio), $SNR_j$ denotes signal to noise ratio of a $j^{th}$ Rx antenna, and h denotes an element of the channel matrix H. In order not to increase power of the entire system, an element a of the beam-forming matrix A must satisfy a condition of Equation (5)

$$\sum_{i=1}^{N} \sum_{j=1}^{M} |a_{i,j}|^2 = 1 \quad (5)$$

Herein, to obtain a maximum diversity order for the channel matrix by using the beam-forming matrix, the element of the beam-forming matrix A are selected so that Equation (6) is satisfied.

$$a_{k,j} = \sqrt{P_j} \frac{h_{j,k}^*}{\sqrt{\sum_{k=1}^{N} |h_{j,k}|^2}} \quad (6)$$

Herein, $P_j$ denotes power of a Tx signal transmitted to the $j^{th}$ Rx antenna, and satisfies a relationship of $$\sum_{j=1}^{M} P_j = 1.$$

For example, in the case of a 2×2 system, Equation (4) and Equation (5) can be expressed as Equation (7). Accordingly, the element a of the beam-forming matrix A can be selected by using Equation (8), and then the beam-forming matrix A can be calculated.

$$|a_{1,1}|^2 + |a_{1,2}|^2 + |a_{2,1}|^2 + |a_{2,2}|^2 = 1 \quad (7)$$

$$\lambda_1 = \frac{|h_{1,1}a_{1,1} + h_{1,2}a_{2,1}|^2}{|h_{1,1}a_{1,2} + h_{1,2}a_{2,2}|^2 + 1/SNR_1},$$

$$\lambda_2 = \frac{|h_{2,1}a_{1,2} + h_{2,2}a_{2,2}|^2}{1/SNR_2}$$

-continued $$a_{1,1} = \frac{\sqrt{P_1} h_{1,1}^*}{\sqrt{|h_{1,1}|^2 + |h_{1,2}|^2}}, \quad a_{1,2} = \frac{\sqrt{P_2} h_{2,1}^*}{\sqrt{|h_{2,1}|^2 + |h_{2,2}|^2}}, \quad (8)$$

$$a_{2,1} = \frac{\sqrt{P_1} h_{1,2}^*}{\sqrt{|h_{1,1}|^2 + |h_{1,2}|^2}}, \quad a_{2,2} = \frac{\sqrt{P_2} h_{2,2}^*}{\sqrt{|h_{2,1}|^2 + |h_{2,2}|^2}}$$

Herein, when two users have the same data rate, and when $\lambda_1 = \lambda_2$, that is, when the two users have the same SINR, then power of the users 1 and 2 are optimized as expressed by Equation (9).

$$\frac{(|h_{1,1}|^2 + |h_{1,2}|^2)P_1}{(1-P_1)\Delta^2 + 1/SNR} = (1-P_1)(|h_{2,1}|^2 + |^2)SNR \quad (9)$$

$$\text{where } \Delta^2 = \frac{(|h_{1,1}h_{2,1}^* + h_{1,2}h_{2,2}^*|^2)}{(|h_{2,1}|^2 + |h_{2,2}|^2)}$$

Herein, an error rate of each user can be properly regulated by using a relation of $\lambda_2 = K\lambda_1$.

In step 205, the BS calculates an integer value, which is in proportion to an interference signal for each Rx antenna. The integer value is used to remove interference that forms a lower triangular matrix from among multi-user interference existing in the Rx signal for each Rx signal. The integer value, which is in proportion to the interference signal is calculated by using a matrix B which is a product of the calculated beam-forming matrix A and the channel matrix H.

An integer value $u_j$, which is in proportion to an interference signal for a symbol to be transmitted to the $j^{th}$ Rx antenna can be calculated by using Equation (10).

$$u_j = \frac{\sum_{i=1}^{j-1} b_{j,i} c_i}{b_{j,j}} \quad (10)$$

Herein, $$\sum_{i=1}^{j-1} b_{j,i} c_i$$

denotes a sum of interference signals for the $j^{th}$ Rx antenna to be eliminated by DPC.

In step 207, by using the integer value calculated for each Rx antenna, the BS performs DPC on the Tx signal to remove interference that forms a lower triangular matrix in the channel matrix among from multi-user interference. As a result, the BS can determine one constellation point by considering interference, and map the Tx signal to the determined point.

Herein, a constellation is used to successfully remove the multi-user interference existing in the Rx signal. The constellation may have a configuration extended from a Quadrature Amplitude Modulation (QAM) configuration. Such a constellation having the configuration extended from the QAM configuration includes a set $A_j = \{a_1, a_2, \ldots, a_{qj}\}$ having qj constellation points for mapping the Tx signal and a set $B_j$ in which locations of the constellation points are extended to the outermost boundaries. The set $B_j$ can be infinitely expanded.

Figure 3:
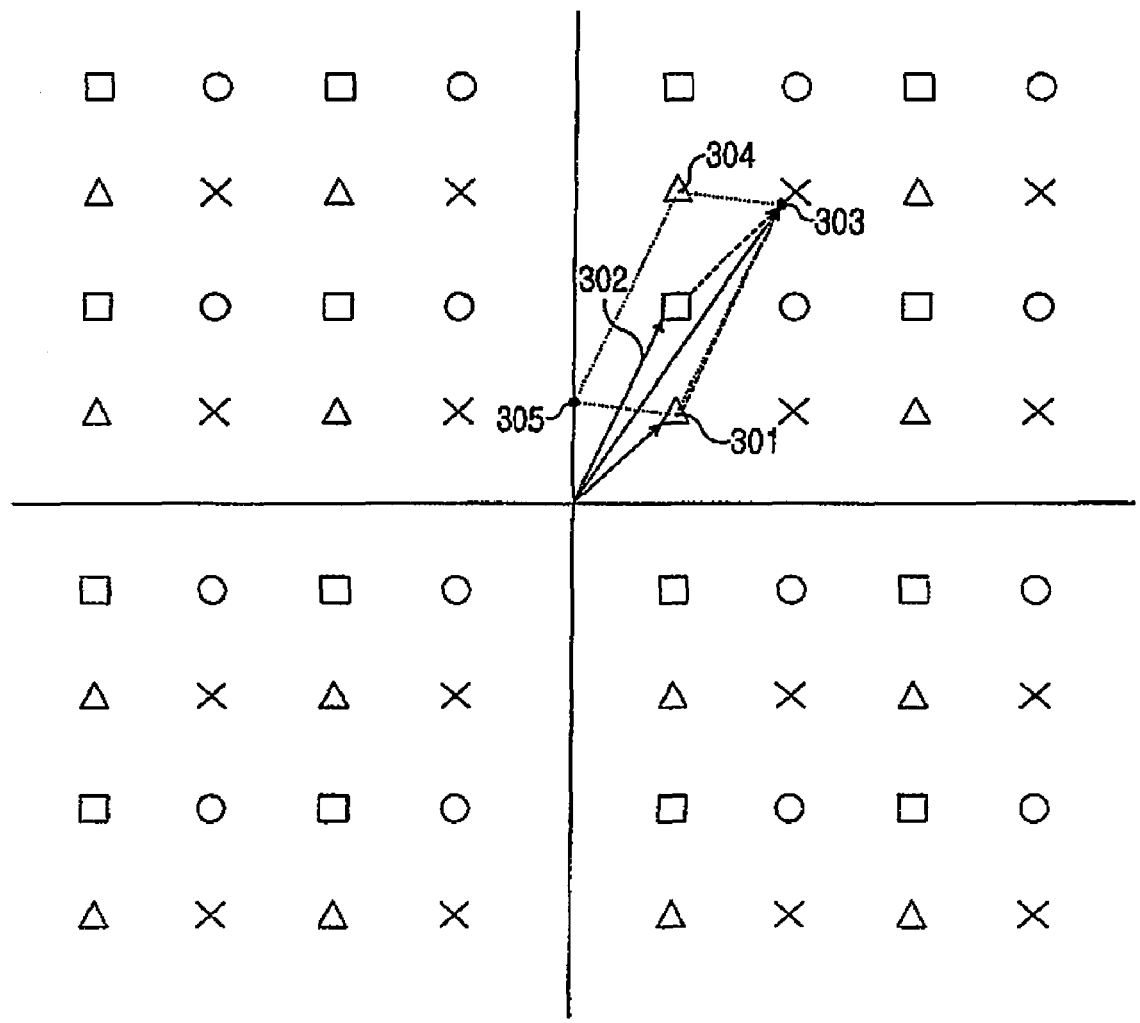
FIG. 3 illustrates a constellation having a configuration extended from a Quadrature Amplitude Modulation configuration, and a Dirty Paper Coding method using the constellation.

Referring to FIG. 3 for example, the set $A_j$ may include symbols (□, □, x, ○) located in the center of the coordinate. The set $B_j$ may be a union of all sets of symbols (□, □, x, ○) located extending along any directions in the coordinate up to the outermost boundaries. A region where the set $A_j$ is located is called a fundamental Voronoi region, which theoretically represents channel coding or modulation points. The remaining area other than the fundamental Voronoi region has a configuration in which the set $A_j$ is repeated with the same pattern, and is called a source coding region or a lattice region. According to the DPC of the present invention, interference is removed in such a manner that, when there is no interference, constellation points of the set $A_j$ is used in signal transmission, and when interference exists, constellation points of the set $B_j$ is used in signal transmission.

The DPC process is carried out as follows. Referring to FIG. 3, when a signal $a_m$ is originally intended to be transmitted to the $j^{th}$ Rx antenna and is mapped to a symbol ((□)) located at a constellation point 301 included in an area of the set $A_j$, the BS adds a vector of the signal $a_m$ and an integer value $u_j$ (indicated by 302) which is in proportion to the calculated interference signal, and thus, determines a first constellation point 303. Next, the BS determines a second constellation point 304 located in an area of the set Bj, wherein the constellation point 304 is the nearest to the first constellation point 303 and has the same type of symbol as the constellation point 301 mapped to the signal $a_m$. Then, the BS calculates a distance between the constellation points 303 and 304. Next, the BS subtracts the calculated distance from the constellation point 301 mapped to the signal $a_m$, and then finally determines a third constellation point 305 for transmitting a Tx signal. The Tx signal is mapped to the finally determined constellation point 305. As such, when the Tx signal is transmitted by mapping to the finally determined constellation point 305, the Tx signal experiences interference (indicated by 302) while the Tx signal is transmitted to a user through a channel. As a result, the Tx signal is transmitted to the user through the constellation point 304 located in the area of the set $B_j$. In this case, through the constellation point 304, the user can recognize that the constellation point 301 is mapped to the signal $a_m$ which is originally intended to be transmitted by the BS.

As interference is removed by performing the DPC, a signal received by a $j^{th}$ user can be expressed by Equation (11).

$$r_j = b_{j,1}c_1 + \ldots + b_{j,j-1}c_{j-1} + b_{j,j}c_j + N_j \quad (11)$$
$$= b_{j,j}u_j + b_{j,j}c_j + N_j$$
$$= (u_j + c_j)b_{j,j} + N_j$$
$$= b_{j,j}v_j + N_j$$

Herein, $c_j$ denotes the finally determined constellation point 305, and $v_j$ denotes the constellation point 304 which is located in the area of the set Bj and through which the user receives a signal. $N_j$ is $b_{j,j+1}c_{j+1} + \ldots + b_{j,M-1}c_{M-1} + b_{j,M}c_M + n_j$, and $b_{j,j+1}c_{j+1} + \ldots + b_{j,M-1}c_{M-1} + b_{j,M}c_M$ is interference removed by performing beam-forming. Although the constellation having the configuration extended from the QAM configuration has been described as an example, the present invention may also apply to another constellation having a configuration extended from a Phase Shift Keying (PSK) configuration.

In step 209, the BS perform beam-forming by multiplying the Tx signal, which is mapped to one constellation point through the DPC, by the determined beam-forming matrix, and then transmits the resultant signal to a corresponding MS. Thereafter, the procedure of FIG. 2 ends.

Figure 4:
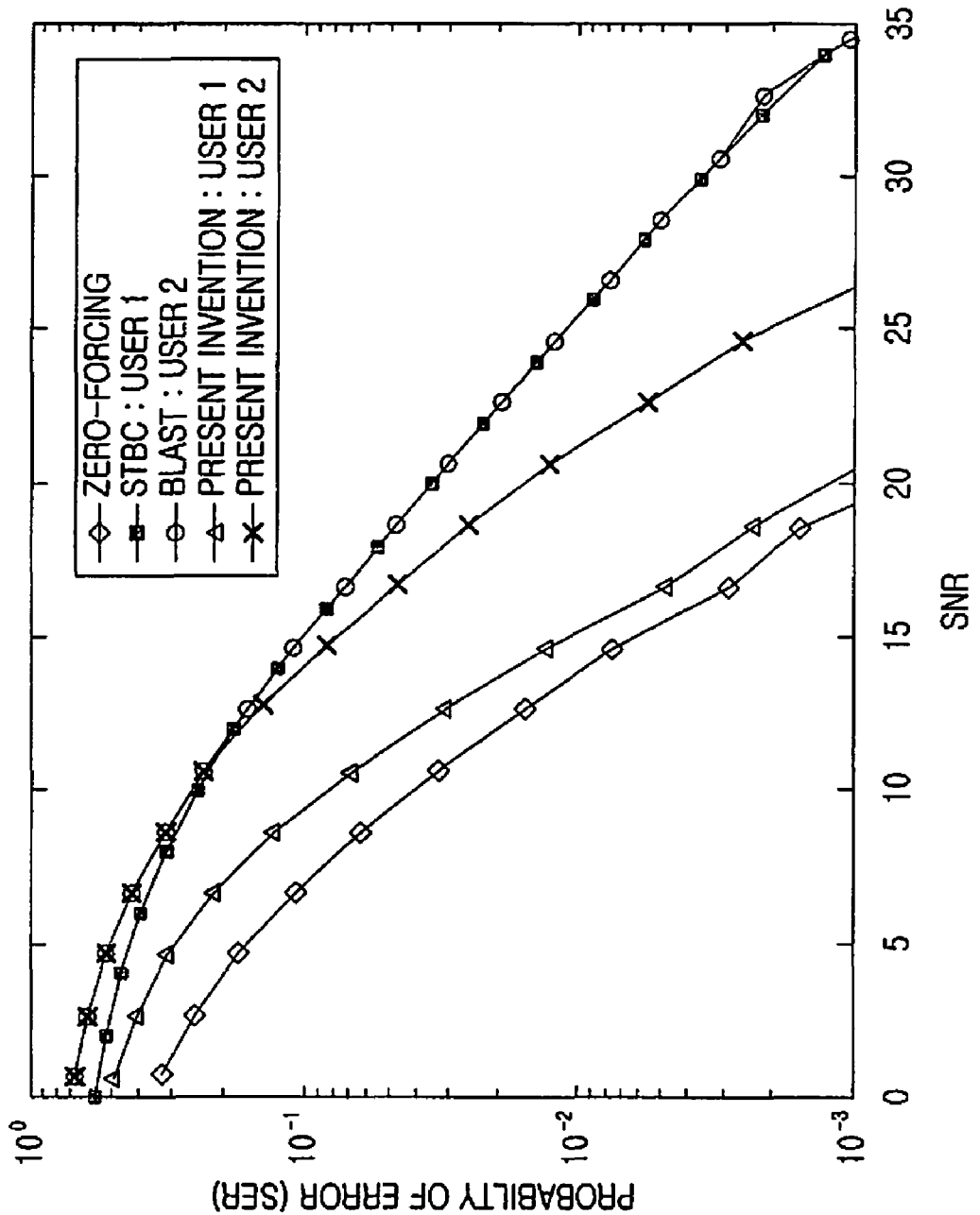
FIG. 4 is a graph illustrating performance of a 2×2 Multi-Input Multi-Output system of the present invention with respect to a conventional system.

FIG. 4 is a graph illustrating performance of a 2×2 MIMO system of the present invention with respect to a conventional system. Referring to FIG. 4, a user 1 and a user 2 according to the present invention have the same slope as the user using a full-rate and full-diversity Space Time Block Coding (STBC) proposed by Alamouti, which shows that both cases have the same diversity order. In addition thereto, since the users 1 and 2 can transmit symbols simultaneously, a data rate of the present invention is two times faster than that of the STBC of Alamouti. This is the same as a Bell-lab Layered Space-Time (BLAST) method, which is optimized in terms of a data rate. Therefore, the present invention provides a highest diversity order and a highest multiplexing order, and shows significantly superior performance to the conventional Zero-Forcing (ZF)-based method.

According to the present invention, in a transmitting end of a multi-antenna system supporting multiple users or a signal user, interference that may exist in an Rx signal is removed by using a DPC-based process and a beam-forming scheme, and thus a highest data rate for each user and a highest diversity can be obtained. In addition, similar performance can be maintained while reducing complexity in comparison with a conventional DPC process.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting a signal in a transmitting end of a multi-antenna system, the method comprising:
   receiving, by a beam-forming matrix calculator, channel information for all Receive (Rx) antennas;
   calculating, by the beam-forming calculator, a beam-forming matrix that maximizes a Signal-to-Interference plus Noise Ratio (SINR) for each Rx antenna by using the received channel information;
   calculating, by a Dirty Paper Coding (DPC) unit, an integer value which is in proportion to an interference signal for each Rx antenna by using the received channel information and the calculated beam-forming matrix, and performing Dirty Paper Coding (DPC) on a Transmit (Tx) signal by using the calculated integer value; and
   performing beam-forming, by a beam-forming unit, by multiplying the Tx signal that has undergone the DPC by the calculated beam-forming matrix.

2. The method of claim 1, wherein the DPC is performed on the Tx signal after the Tx signal is modulated and channel-encoded.

3. The method of claim 1, wherein the SINR for each Rx antenna is calculated by:

$$\lambda_j = \frac{|b_{j,j}|^2}{|b_{j,j+1}|^2 + \ldots + |b_{j,M}|^2 + 1/SNR_j} \text{ where } b_{i,j} = \sum_{k=1}^{N} h_{j,k} a_{k,j},$$

where $\lambda_j$ denotes the SINR, $SNR_j$ denotes a signal to noise ratio of a $j^{th}$ Rx antenna, N denotes the number of Tx antennas, h denotes an element of a channel matrix H, a denotes an element of a beam-forming matrix A, and b denotes an element of a matrix B which is a product of the channel matrix B and the beam-forming matrix A.

4. The method of claim 1, wherein a sum of power of all elements of the beam-forming matrix is a constant.

5. The method of claim 1, wherein each element of the beam-forming matrix is calculated by:

$$a_{k,j} = \sqrt{P_j} \frac{h^*_{j,k}}{\sqrt{\sum_{k=1}^{N} |h_{j,k}|^2}},$$

where a denotes an element of a beam-forming matrix A, $P_j$ denotes power of a Tx signal to be transmitted to a $j^{th}$ Rx antenna, N denotes the number of Tx antennas, and h denotes an element of a channel matrix H.

6. The method of claim 1, further comprising determining power for each Rx antenna according to the SINR for each Rx antenna.

7. The method of claim 1, wherein the integer value, which is in proportion to the interference signal is calculated by:

$$u_j = \frac{\sum_{i=1}^{j-1} b_{j,i} c_i}{b_{j,j}},$$

where $u_j$ denotes an integer value which is in proportion to an interference signal for a signal transmitted to a $j^{th}$ Rx antenna, $$\sum_{i=1}^{j-1} b_{j,i} c_i$$

denotes a sum of interference signals for the $j^{th}$ Rx antenna, i denotes a Tx antenna index, b denotes an element of a matrix B which is a product of a channel matrix H and a beam-forming matrix A, and c denotes a modulated and channel-encoded Tx signal.

8. The method of claim 1, wherein a constellation used for the DPC has a configuration extended from a Quadrature Amplitude Modulation (QAM) configuration or a Phase Shift Keying (PSK) configuration.

9. The method of claim 8, wherein the constellation for the DPC comprises a first set having a predetermined number of constellation points for mapping the Tx signal and a second set in which locations of the constellation points are extended to the outermost boundaries.

10. The method of claim 9, wherein the performing of DPC comprises:
   determining a first constellation point on the constellation by adding a signal originally intended to be transmitted and an integer value which is in proportion to the calculated interference signal;
   determining a second constellation point included in the second set, where the second constellation point is the nearest to the first constellation point and has the same type of symbol as a constellation point which is included in the first set and is mapped to the signal originally intended to be transmitted;
   calculating a distance between the first constellation point and the second constellation point included in the second set;
   determining a third constellation point for transmitting the Tx signal on the constellation by subtracting the calculated distance from the constellation point mapped to the signal originally intended to be transmitted; and
   mapping the Tx signal to the determined third constellation point.

11. An apparatus for transmitting a signal in a transmitting end of a multi-antenna system, the apparatus comprising:
   a beam-forming matrix calculator for receiving channel information for all Receive (Rx) antennas and for calculating a beam-forming matrix that maximizes a Signal-to-Interference plus Noise Ratio (SINR) for each Rx antenna by using the received channel information;
   a Dirty Paper Coding (DPC) unit for calculating an integer value which is in proportion to an interference signal for each Rx antenna by using the received channel information and the calculated beam-forming matrix, and for performing DPC on a Transmit (Tx) signal by using the calculated integer value; and
   a beam-forming unit for performing beam-forming by multiplying the Tx signal that has undergone the DPC by the calculated beam-forming matrix.

12. The apparatus of claim 11, wherein the DPC is performed on the Tx signal after the Tx signal is modulated and channel-encoded.

13. The apparatus of claim 11, wherein the SINR for each Rx antenna is calculated by:

$$\lambda_j = \frac{|b_{j,j}|^2}{|b_{j,j+1}|^2 + \ldots + |b_{j,M}|^2 + 1/SNR_j} \quad \text{where} \quad b_{i,j} = \sum_{k=1}^{N} h_{j,k} a_{k,j}$$

where $\lambda_j$ denotes the SINR, $SNR_j$ denotes a signal to noise ratio of a $j^{th}$ Rx antenna, N denotes the number of Tx antennas, h denotes an element of a channel matrix H, a denotes an element of a beam-forming matrix A, and b denotes an element of a matrix B which is a product of the channel matrix B and the beam-forming matrix A.

14. The apparatus of claim 11, wherein a sum of power of all elements of the beam-forming matrix is a constant.

15. The apparatus of claim 11, wherein each element of the beam-forming matrix is calculated by:

$$a_{k,j} = \sqrt{P_j} \frac{h^*_{j,k}}{\sqrt{\sum_{k=1}^{N} |h_{j,k}|^2}}$$

where a denotes an element of a beam-forming matrix A, $P_j$ denotes power of a Tx signal to be transmitted to a $j^{th}$ Rx antenna, N denotes the number of Tx antennas, and h denotes an element of a channel matrix H.

16. The apparatus of claim 11, wherein the beam-forming matrix calculator determines power for each Rx antenna according to the SINR for each Rx antenna.

17. The apparatus of claim 11, wherein the integer value, which is in proportion to the interference signal is calculated by:

$$u_j = \frac{\sum_{i=1}^{j-1} b_{j,i} c_i}{b_{j,j}},$$

where $u_j$ denotes an integer value which is in proportion to an interference signal for a signal transmitted to a $j^{th}$ Rx antenna, $$\sum_{i=1}^{j-1} b_{j,i} c_i$$

denotes a sum of interference signals for the $j^{th}$ Rx antenna, i denotes a Tx antenna index, b denotes an element of a matrix B which is a product of a channel matrix H and a beam-forming matrix A, and c denotes a modulated and channel-encoded Tx signal.

18. The apparatus of claim 11, wherein a constellation used for the DPC has a configuration extended from a Quadrature Amplitude Modulation (QAM) configuration or a Phase Shift Keying (PSK) configuration.

19. The apparatus of claim 18, wherein the constellation for the DPC comprises a first set having a predetermined number of constellation points for mapping the Tx signal and a second set in which locations of the constellation points are extended to the outermost boundaries.

20. The apparatus of claim 19, wherein the DPC unit comprises:

means for determining a first constellation point on the constellation by adding a signal originally intended to be transmitted and an integer value which is in proportion to the calculated interference signal;

means for determining a second constellation point included in the second set, where the second constellation point is the nearest to the first constellation point and has the same type of symbol as a constellation point which is included in the first set and is mapped to the signal originally intended to be transmitted;

means for calculating a distance between the first constellation point and the second constellation point included in the second set;

means for determining a third constellation point for transmitting the Tx signal on the constellation by subtracting the calculated distance from the constellation point mapped to the signal originally intended to be transmitted; and means for mapping the Tx signal to the determined third constellation point.

* * * * *